United States Patent
Yoshida

(10) Patent No.: US 7,714,543 B2
(45) Date of Patent: May 11, 2010

(54) INPUT/OUTPUT POWER CONTROL APPARATUS AND METHOD FOR SECONDARY BATTERY

(75) Inventor: Shinsuke Yoshida, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 484 days.

(21) Appl. No.: 11/826,029

(22) Filed: Jul. 11, 2007

(65) Prior Publication Data
US 2008/0048619 A1    Feb. 28, 2008

(30) Foreign Application Priority Data

Jul. 12, 2006    (JP) .............................. 2006-191658
Jun. 29, 2007    (JP) .............................. 2007-172121

(51) Int. Cl.
*H02J 7/00*    (2006.01)
*G06F 7/00*    (2006.01)

(52) U.S. Cl. ........................................ 320/134; 701/22

(58) Field of Classification Search ................. 320/116, 320/117, 119, 121, 123, 134, 136, 148, 152; 701/22, 34, 36; 318/139, 800, 802, 806; 307/9.1, 10.1, 10.7; 903/903, 907; 180/65.1, 180/65.21; 290/7, 16
See application file for complete search history.

(56) References Cited

U.S. PATENT DOCUMENTS 6,018,694 A * 1/2000 Egami et al. ................. 701/102
6,687,581 B2 * 2/2004 Deguchi et al. ................ 701/22
6,891,279 B2 * 5/2005 Kazama ..................... 290/40 C
2005/0275407 A1 * 12/2005 Yumoto et al. .............. 324/426

FOREIGN PATENT DOCUMENTS

JP    2000-357541 A    12/2000

OTHER PUBLICATIONS

U.S. Appl. No. 11/785,066, filed Apr. 13, 2007, Tsuyoshi Morita.
U.S. Appl. No. 11/785,078, filed Apr. 13, 2007, Tsuyoshi Morita.

* cited by examiner

*Primary Examiner*—Patrick J Assouad
*Assistant Examiner*—M'Baye Diao
(74) *Attorney, Agent, or Firm*—Foley & Lardner LLP

(57) ABSTRACT

In input/output power control apparatus and method for a secondary battery, in a case where neither a current sensor nor a voltage sensor fails, allowable input/output powers which are an allowable input power by which the secondary battery allowably inputs and an allowable output power by which the secondary battery allowably outputs are calculated on the basis of an input and/or output current and a terminal voltage of the secondary battery and, in a case where the failure in either one of the current sensor and the voltage sensor is detected, the allowable input/output powers are calculated on the basis of a detected value of one of the current and voltage sensors in which no failure is detected, and each of input and output powers of the secondary battery is limited to be equal to or smaller than the corresponding one of the allowable input/output powers.

26 Claims, 11 Drawing Sheets

FIG.6A
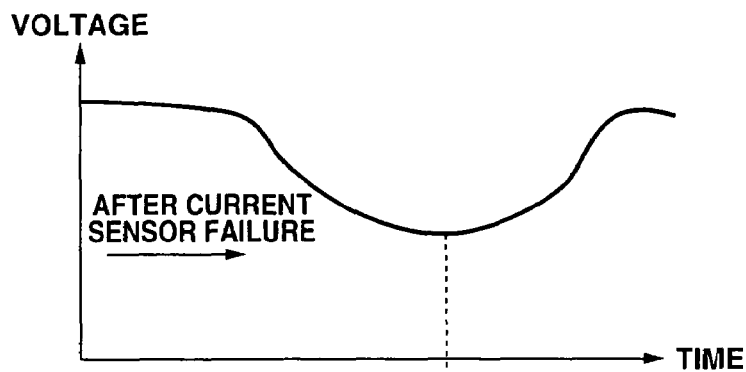
FIG.6B
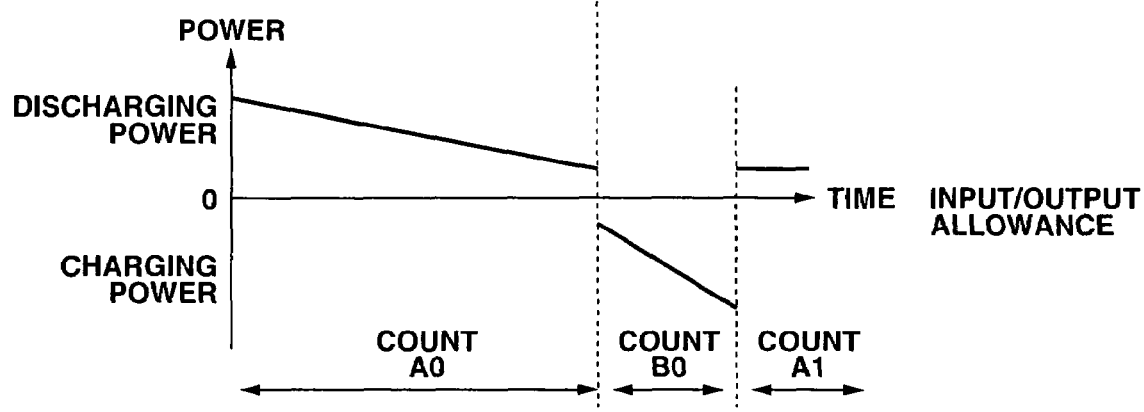
FIG.6C
| VOLTAGE (V) | COUNT DIFFERENCE |
|---|---|
| 400~350 | $250 \leq (A_0+A_1+...+A_n) - (B_0+B_1+...+B_n) < 500$ |
| 350~300 | $0 \leq (A_0+A_1+...+A_n) - (B_0+B_1+...+B_n) < 250$ |
| 250~300 | $-250 \leq (A_0+A_1+...+A_n) - (B_0+B_1+...+B_n) < 0$ |
| 200~250 | $-500 \leq (A_0+A_1+...+A_n) - (B_0+B_1+...+B_n) < 250$ |

INPUT/OUTPUT POWER CONTROL APPARATUS AND METHOD FOR SECONDARY BATTERY

BACKGROUND OF THE INVENTION (1) Background of the Invention

The present invention relates to input/output (electric) power control apparatus and method for a secondary battery and, particularly, relates to a control technology for the secondary battery during a failure in a current sensor or a voltage sensor.

(2) Description of Related Art

A Japanese Patent Application (First) Publication No. 2000-357541 published on Dec. 26, 2000 exemplifies a previously proposed input/output power control apparatus for a secondary battery. In such a previously proposed input/output control apparatus as described in the above-identified Japanese Patent Application Publication, a current sensor configured to detect an input and/or output current and a voltage sensor configured to detect a terminal voltage of the secondary battery are equipped. In addition, a residual capacity (viz., a charge rate or SOC: State Of Charge) of the secondary battery is detected in accordance with the detected input and/or output current and the terminal voltage and a control over input and output powers (or simply called input/output powers, the input power means a charging power and the output power means a discharging power) on the basis of the detected residual capacity. Hence, when either the current sensor or the voltage sensor has failed, it becomes difficult to perform a normal (or an ordinary) control over the input/output powers of the secondary battery.

In the previously proposed input/output power control apparatus disclosed in the above-described Japanese Patent Application Publication, in a case where the voltage sensor is detected to fail, a method is described in which the input and/or output current is reduced to a value smaller than an ordinary input and/or output current (or an ordinary input and/or output electric power) or limited to a value equal to or smaller than a predetermined value. Thus, while individual battery cells are (or the secondary battery is) protected, the input/output powers thereof are controlled.

SUMMARY OF THE INVENTION

However, in the method described in the above-described Japanese Patent Application Publication, the input/output current (or the input and/or output current) is merely reduced or limited when the failure in either of the sensors occurs. Hence, in a case where the previously proposed input/output power control apparatus is applied to a secondary battery from which the electric power is supplied to, for example, a driving motor of either a hybrid vehicle or an electric vehicle, the input and/or output current (or the input/output powers) is reduced irrespective of a charge state of the secondary battery. Thus, there is a possibility of a driving force of the driving motor to always be reduced so that an unpleasant feeling is given to a vehicle driver.

It is, hence, an object of the present invention to provide input/output power control apparatus and method for the secondary battery which are capable of performing an appropriate control of each of the input and output powers (or input and/or output current) of the secondary battery even during the failure in either of the sensors.

According to one aspect of the present invention, there is provided an input/output power control apparatus for a secondary battery, comprising: a current sensor configured to detect an input and/or output current of the secondary battery; a voltage sensor configured to detect a terminal voltage of the secondary battery; a sensor failure detecting section configured to detect at least one of failures in the current sensor and in the voltage sensor; an allowable input/output power calculating section configured to calculate an allowable input power by which the secondary battery allowably inputs and an allowable output power by which the secondary battery allowably outputs in a form of allowable input/output powers on the basis of the terminal voltage detected by the voltage sensor and the input and/or output current of the secondary battery detected by the current sensor, in a case where the sensor failure detecting section detects the failure in neither the current sensor nor the voltage sensor, and to calculate the allowable input/output powers on the basis of a detected value of one of the current sensor and the voltage sensor in which the sensor failure detecting section detects no failure, in a case where the failure detecting section detects the failure in either one of the current sensor and the voltage sensor; and an input/output power control section configured to limit each of input and output powers of the secondary battery to a value equal to or smaller than the corresponding one of the allowable input/output powers calculated by the allowable input/output power calculating section.

According to another aspect of the present invention, there is provided an input/output power control method for a secondary battery, comprising: providing a current sensor configured to detect an input and/or output current of the secondary battery; providing a voltage sensor configured to detect a terminal voltage of the secondary battery; detecting at least one of failures in the current sensor and in the voltage sensor; in a case where neither the current sensor nor the voltage sensor is detected to fail, calculating an allowable input power by which the secondary battery allowably inputs and an allowable output power by which the secondary battery allowably outputs in a form of the allowable input/output powers on the basis of the input and/or output current detected by the current sensor and the terminal voltage of the secondary battery detected by the voltage sensor and, in a case where the failure in either one of the current sensor and the voltage sensor is detected, calculating the allowable input/output powers on the basis of a detected value of one of the current and voltage sensors in which no failure is detected; and limiting each of input and output powers of the secondary battery to be equal to or smaller than the corresponding one of the allowable input/output powers.

In the present invention, when either the voltage sensor or the current sensor is detected to fail, the allowable input/output powers which are electric powers by which the secondary battery is allowed to input (allowably inputs) and allowed to output (allowably outputs) on the basis of a detected value detected by means of one of the current and voltage sensors which is detected not to fail (operates normally) is calculated and the input/output powers of the secondary battery is limited to a value equal to or smaller than the allowable input/output powers of the secondary battery. Hence, an excessive discharge of the secondary battery and an excessive charge thereof can be prevented from occurring and the unpleasant feeling can be prevented from being given to the vehicle driver as minor as possible. This summary of the invention does not necessarily describe all necessary features so that the invention may also be a sub-combination of these described features. The other objects and features of this invention will become understood from the following description with reference to the accompanying drawings.

BRIEF DESCRIPTION OF THE DRAWINGS

FIGS. 6A, 6B, and 6C are characteristic graphs and a table representing examples of a terminal voltage variation and input-and-output power variation.

DETAILED DESCRIPTION OF THE INVENTION

Reference will hereinafter be made to the drawings in order to facilitate a better understanding of the present invention.

Figure 1:
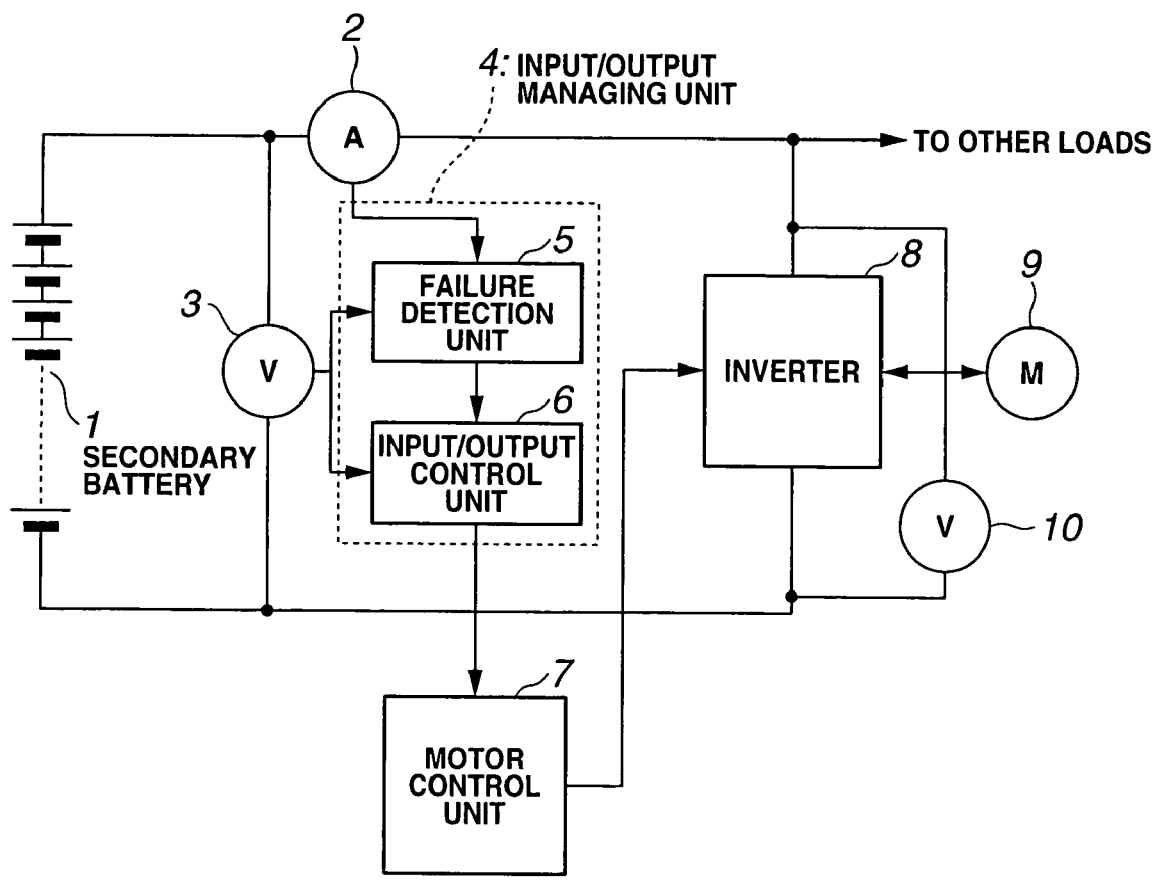
FIG. 1 is a functional block diagram of a whole structure of a preferred embodiment of an input/output power control apparatus for a secondary battery according to the present invention.

FIG. 1 shows a schematic block diagram representing a preferred embodiment of an input/output power control apparatus according to the present invention which is common to all examples shown in FIGS. 2 through 11 (except FIGS. 6A, 6B, and 6C) and exemplifies a case where the present invention is applicable to a system for drivingly control an electric motor of an electric vehicle or a hybrid automotive vehicle. In FIG. 1, a secondary battery 1 is constituted by a plurality (for example, several ten through several hundred numbers) of secondary cell units connected in series with one another or connected in series and in parallel with one another. A current sensor 2 is configured to detect an input and/or output current (also called, a charge and/or discharge current) of secondary battery 1. A voltage sensor 3 is configured to detect a terminal voltage of secondary battery 1. Another voltage sensor 10 is provided to detect a voltage inputted to an inverter. Current sensor 2 is a well known sensor which detects a voltage across both ends of a shunt resistor via lead wires connected to both ends of the shunt resistor and converts the detected voltage described above into a current. An input/output managing unit 4 (viz., an input/output (electric) power control apparatus) includes a failure detection unit 5 (corresponds to a sensor failure detecting section) to detect a failure in current sensor 2 and an input/output control unit 6 (the details of input/output managing unit 6 will be described later). A reference numeral 7 denotes a motor control unit, a reference numeral 8 denotes an inverter, and a reference numeral 9 denotes a motor to drive a vehicle. It should be noted that another voltage sensor 10 is a voltage sensor ordinarily installed in inverter 8 to control inverter 8 (to detect a voltage inputted to inverter 8).

Input/output managing unit 4 (constituted by a computer including a CPU (Central Processing Unit) and a memory, as will be described later) detects a failure in current sensor 2 or voltage sensor 3 on the basis of an input and/or output (charge and/or discharge) current value of secondary battery 1 detected by current sensor 2 and a terminal voltage value of secondary battery 1, calculates allowable input/output powers or input/output power limitation values, as will be described later, and outputs these values to motor control unit 7. It should be noted that the allowable input/output powers are read as the allowable input power and the allowable output power and the input/output power limitation values are read as the input power limitation value and the output power limitation value. Motor control unit 7 is constituted by a computer and an electronic circuit including, for example, another CPU and another memory. Motor control unit 7 calculates a torque target value which is a target value of a driving torque to be generated by motor 9 on the basis of external signals such as a signal from an accelerator pedal (not shown) or a signal indicating a vehicle speed and generates driving signals (for example, PWM (Pulse Width Modulated) signal) based upon a voltage detected by voltage sensor 10 which control switching elements of inverter 8 to drive or regenerate electric motor 9 at an electric power in accordance with the torque target value, the electric power not exceeding the allowable input/output powers or the input/output power limitation values inputted from input/output managing unit 4. In addition, motor control unit 7 generates driving signals (for example, the PWM signals) for controlling switching elements of inverter 8 in order for electric motor 9 to be driven or regenerated. Inverter 8 opens and closes their switching elements in accordance with the above-described driving signals, inverts the (DC) power of secondary battery 1 into a corresponding alternating (AC) power, and drives electric motor 9 or charges secondary battery 1 with the power generated at motor 9 during a regeneration operation.

Hereinafter, input/output managing unit 4 which is a gist of the present invention will be described. Input/output managing unit 4 is constituted by the computer, for example, including the CPU (Central Processing Unit) and the memory. Input/output managing unit 4 functionally includes, in terms of functional blocks: a failure detection unit 5 (corresponding to a sensor failure detecting section) to detect a failure in a current sensor 2; and an input/output control unit 6 to calculate the allowable input/output (electric) powers for the input/output powers of secondary battery 1.

Failure detection unit 5 detects the failure in current sensor 2, for example, in the following way.

(1) Failure in current sensor 2 is mainly caused by a breakage of connection line or a short-circuiting, as is well known. Current sensor 2 detects, for example, a voltage across terminals of a shunt resistor and its detected voltage is converted into a current value. Hence, in a case where the shunt resistor is broken (line breakage), the detected voltage value is fixed to an upper limit value (for example, 5 volts). In a case where the shunt resistor is short-circuited or a lead wire connected across the respective ends of the shunt resistor is broken, the detected value of the voltage is fixed to a lower limit value (for example, 0 volts). Hence, in a case where the upper limit value or the lower limit value is continued for a predetermined time or longer, failure detection unit 5 determines (detects) that the failure in current sensor 2 occurs.

(2) Failure in current sensor 2 is detected by comparing the flowing current through current sensor 2 with the current flowing through a load. Other current sensors are ordinarily installed (not shown) in inverter 8 which provides a load for secondary battery 1 and in electric motor (M; 9) which also provides the load for secondary battery 1. The failure in current sensor 2 can be detected by comparing the load current value with the current flowing through current sensor 2. As shown in FIG. 1, the load includes other than inverter 8 and electric motor 9 (for example, accessories of the vehicle). Hence, there is a high possibility that, during an output from secondary battery 1 (during the discharging of secondary battery 1), the current value of current sensor 2 detected by a part of loads such as inverter 8 becomes smaller than the current value of current sensor 2 nearer to secondary battery 1. Hence, in a case where the current value of current sensor 2 is smaller than a current value detected by the current sensor installed in inverter 8, failure detection unit 5 can detect the failure in current sensor 2.

Hereinafter, a calculating procedure executed in input/output managing unit 4 shown in FIG. 1 will be described with reference to each of flowcharts.

Figure 2:
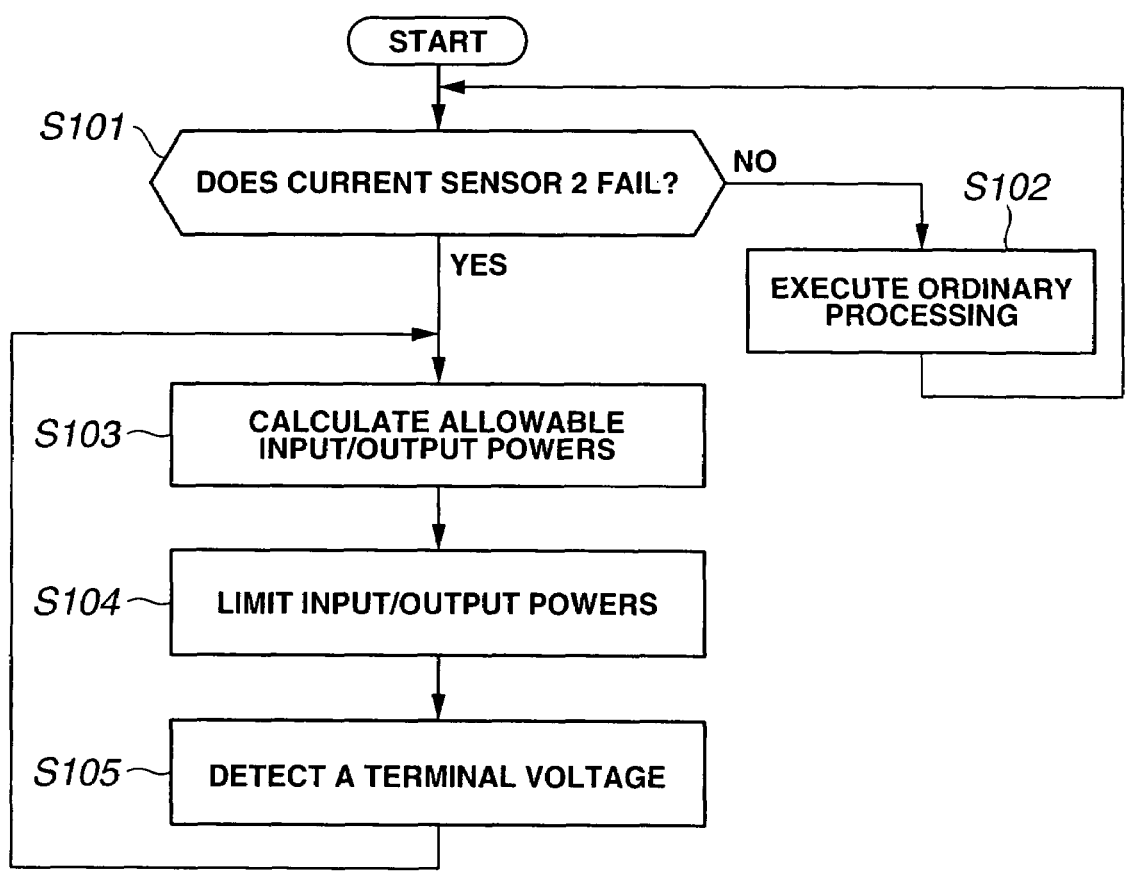
FIG. 2 is an flowchart representing a first example of a processing flowchart executed in an input/output managing unit of the input/output power control apparatus shown in FIG. 1.

FIG. 2 shows a flowchart representing a first example of the calculating procedure executed in input/output managing unit 4. The processing described in the flowchart shown in FIG. 2 is started from a system activation and is repeated until a stop of the system.

The processing from a step S103 to a step S105 as will be described later is repeated at a predetermined frequency period (for example, about 100 milliseconds). In FIG. 2, at a step S101, input/output managing unit 4 determines whether failure detection unit 5 detects the failure in current sensor 2. If current sensor 2 is normal (failure detection unit 5 doers not detect the failure in current sensor 2) (No) at step S101, the routine goes to a step S102. At step S102, input/output control unit 6 executes an ordinary processing. It should be noted that the ordinary processing is a well known input and/or output electric power managing operation and various methods are known. For example, the following methods are executed. In details, input/output control unit 6 determines an open voltage (open-circuit voltage) of secondary battery 1 from a current-voltage characteristic of secondary battery 1 on the basis of a charge and/or discharge current value of secondary battery 1 detected by current sensor 2 and a terminal voltage across secondary battery 1 detected by voltage sensor 3, (the current-voltage characteristic being defined by sampling the charge-and/or-discharge current and the terminal voltage by a plurality of number of times and a linear approximation of a correlation between the charge-and/or-discharge current and the terminal voltage and also being referred to as an I-V straight line), detects a residual capacity of secondary battery 1 based on the determined open voltage, and the correlation between the open voltage and the residual capacity empirically determined, and stores the detected residual capacity of secondary battery 1 into a memory (not shown). It should be noted that the residual capacity stored in the memory is updated whenever the new residual capacity is calculated. Next, on the basis of the residual capacity of secondary battery 1, a residual capacity difference between a predetermined upper limit residual capacity (a residual capacity immediately before the generation of an irreversible deterioration in secondary battery 1 due to an excessive charging) and a predetermined lower limit residual capacity (the residual capacity immediately before the generation of secondary battery 1 due to an excessive discharging) is calculated and allowable input and output powers (hereinafter, generally referred to as allowable input/output powers) which are constituted by the allowable input (chargeable) power and the allowable output (dischargeable) power on the basis of the calculated residual capacity difference is calculated and outputted to motor control unit 7. Motor control unit 7 controls inverter 8 for a consumption power and a regenerative power not to be out of the allowable input/output powers. It should be noted that, the remaining detection method for the residual capacity of the secondary battery includes a method in which the residual capacity is calculated from a voltage (an open voltage) of secondary battery 1 during a non-load of secondary battery 1 and the residual capacity is detected by adding and subtracting an input and/or output current accumulated value accumulated by the input and/or output current of secondary battery 1 from the residual capacity, and a combination of the latter and former methods, and various other methods.

At any rate, in these well known detection methods of the residual capacity of secondary battery 1, the charge-and/or-discharge current value of secondary battery 1 detected by current sensor 4 and the terminal voltage of secondary battery 1 detected by voltage sensor 3 are used. Hence, in the control method of the input/output electric powers, the charge-and/or-discharge current value of secondary battery 1 detected by current sensor 2 and the terminal voltage of secondary battery 1 detected by voltage sensor 3 are used. It should be noted that the residual capacity of secondary battery 1 corresponds to the residual electric energy of secondary battery 1 and, in general, is represented by a charge rate (SOC: a residual energy rate to an energy of full charge of secondary battery 1 and indicates 100% when a full (complete) charge occurs and indicates 0% when a full (complete) discharge occurs). Hence, hereinafter, the residual capacity is often described as the charge rate or SOC (State Of Charge). If failure detection unit 5 detects that the failure in current sensor 2 occurs (Yes at step S101), the routine goes to step S103 to determine SOC on the basis of only the terminal voltage of secondary battery 1 and calculates the allowable input/output powers which are the electric powers for secondary battery 1 to be allowed to input and to output into and from secondary battery 1 from the calculated SOC.

The allowable input/output powers at step S103 is calculated in the following way.

The allowable input/output powers are input-and-output enabled powers (chargeable and dischargeable powers) until the SOC of secondary battery 1 becomes equal to or smaller than a predetermined upper limit SOC and becomes equal to or larger than a predetermined lower limit value SOC (as described above, the charge rate in a range in which the irreversible deterioration is not developed in the secondary battery). It should herein be noted that the predetermined upper limit SOC and the predetermined lower limit SOC are values predetermined through experiments. Since the SOC has a correlation with the open voltage of secondary battery 1, it is possible to estimate the SOC on the basis of the terminal voltage provided that a slight error (a variation in a difference between the terminal voltage and the open voltage which is varied in accordance with a variation in an internal resistance of the secondary battery) is allowed. Therefore, with a relationship between SOC of secondary battery 1 and the terminal voltage thereof previously stored as a map, the charge rate is derived from the stored map according to the terminal voltage detected by voltage sensor 3. The allowable input/output powers can be calculated on the basis of the determined SOC and the difference between the (predetermined) upper limit SOC and the (predetermined) lower limit SOC. It should be noted that an error is developed due to the variation in the internal resistance of secondary battery 1 when the SOC is estimated on the basis of only the terminal voltage as described above. Therefore, with the estimation error of SOC of secondary battery 1 taken into consideration, the upper limit SOC is preferably set to a value smaller than the upper limit SOC when current sensor 3 is normal and the lower limit SOC is preferably set to a value larger than the lower limit SOC when current sensor 3 is normal.

At step S104, input/output managing unit 4 commands motor control unit 7 for actual input/output powers (the consumed power and the regenerative power of electric motor 9) not to exceed the allowable input/output powers, respectively. It should be noted that motor control unit 7 functions as an input/output power control unit for the input/output powers to be limited to a value equal to or lower than the allowable input/output powers. At a step S105, input/output managing unit 4 detects the terminal voltage of secondary battery 1 and calculates again the allowable input/output powers at step S103 in accordance with the detected terminal voltage. That is to say, the electric power corresponding to a difference between the upper limit SOC and the present charge rate SOC detected from the terminal voltage is the chargeable electric power (allowable input power) and the electric power corresponding to the difference between the lower limit SOC and the present charge rate of SOC is the dischargeable electric power (allowable output power).

It should be noted that, in the above example, the SOC is calculated from the terminal voltage and the allowable input/output powers are calculated from the calculated SOC. However, the upper limit SOC is the predetermined value. Thus, if the present SOC of secondary battery 1 is detected, the difference between the upper limit SOC and the present SOC (viz., the allowable input power) is, uniquely, derived. In the same manner, the lower limit SOC is also the predetermined value. Thus, if the present SOC of secondary battery 1 is detected, the difference between lower limit SOC and the present charge rate SOC (that is to say, the allowable output power) is, uniquely, derived. Hence, with the correlation between the allowable input/output powers and the terminal voltage of the secondary battery previously stored in the memory, the allowable input/output powers can also be derived directly on the basis of the stored correlation, from the terminal voltage detected by voltage sensor 3. Then, the input/output control unit 6 commands motor control unit 7 for the input/output (input-and-output) powers of secondary battery 1 to be equal to or smaller than the allowable input/output (input-and-output) powers, respectively. Motor control unit 7 controls inverter 8 to control the input/output powers for the consumption power of electric motor 9 (output power) and the regenerated power (input power) thereof to be equal to or smaller than the allowable input/output powers. It should be noted that, in a strict sense of the term, a total value of the consumed powers of all loads are the output power of secondary battery 1. However, the consumed power of motor 9 for the vehicle driving purpose is extremely large as compared with the consumed power of any other loads. Hence, in this embodiment, the control of only the consumed power of motor 9 is performed so that the output power of secondary battery 1 is controlled. In the same manner, the electric power which is a subtraction of the consumed power of all loads from the regenerated electric power of motor 9, in the strict sense of the term, is the input power of secondary battery 1. However, since the regenerative power of motor 9 is only controlled, in this embodiment, the input power of secondary battery 1 is controlled. It should be noted that, the input/output powers of secondary battery 1 may be controlled on the basis of the consumed power of any one of the other loads, the consumed power of motor 9, and the regenerated power of motor 9, with the consumed power of the other load detected.

As described above, in the present invention, during the failure in current sensor 2, the input/output powers of secondary battery 1 can be controlled for the input/output powers to fall within the range of the allowable input/output powers on the basis of only the terminal voltage detected by voltage sensor 3. Hence, excessive discharge and excessive charge of secondary battery 1 are prevented from being occurred and secondary battery 1 is protected. In addition, it is not necessary to provide dual current sensors and it is not necessary to stop the vehicle. Furthermore, in order to, for example, protect secondary battery 1, in a case where the input/output powers are merely reduced, or in a case where the input/output powers are limited to predetermined constant input/output powers or smaller, the input/output powers are limited in spite of the fact that a sufficient residual capacity of secondary battery 1 remains. As a result of this, a driving force of electric motor 9 is reduced and a performance of the vehicle is reduced. Thus, there is a possibility that an unpleasant feeling is given to the vehicle driver. However, as described above, since the allowable input/output powers are calculated on the basis of the terminal voltage of secondary battery 1. Hence, the allowable input/output powers can be varied on the basis of the residual capacity (charge rate) of secondary battery 1. Thus, without reduction in the performance of the vehicle as low as possible, secondary battery 2 can be protected.

Figure 3:
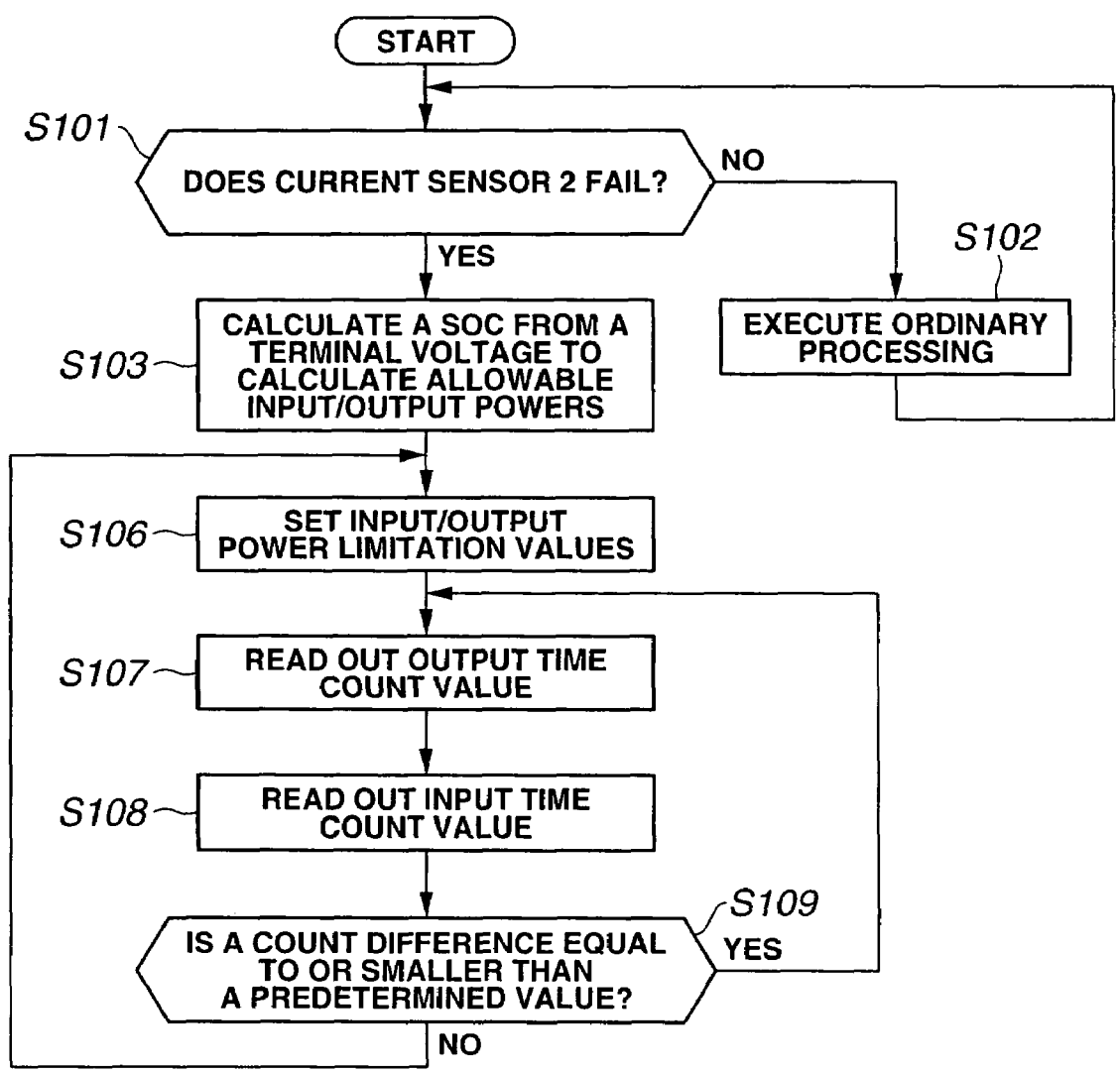
FIG. 3 is a flowchart representing a second example of the processing flowchart executed in the input/output managing unit of the input/output power control apparatus shown in FIG. 1.

Next, FIG. 3 shows a second example of the calculating procedure (processing contents) executed in the input/output managing unit 4. The processing of the flowchart shown in FIG. 3 is started in response to the activation of the system and is repeated until the system is stopped in the same way as the processing contents of the flowchart of FIG. 2. In FIG. 3, steps S101 through S103 are the same as those shown in FIG. 2. The detailed explanation of the same steps will herein be omitted. Next, at a step S106, input/output managing unit 4 sets a predetermined input power limitation value equal to or smaller than the allowable input power and a predetermined output power limitation value equal to or smaller than the allowable output power and commands motor control unit 7 to limit the consumed power (output power) or the regenerative power (input power) to the above-described output power limitation value and the predetermined input power limitation value. It should be noted that the details of above-described input power limitation value and the output power limitation value will be described later. However, for example, during an initial setting, the allowable input power and the allowable output power are set as the input power limitation value and the output power limitation value, respectively. At steps S107 and S108, input/output managing unit 4 ascertains (reads out) an accumulated value of an output time and the accumulated value of an input time, the output time being derived from an output time counter counting an output time for which the electric power is outputted (discharged) from secondary battery 1 and an input time being derived from an input time counter counting an input time for which the electric power is inputted (charged) into secondary battery 1. At this time, the output time counter and input time counter are incorporated into input/output managing unit 4 continuing the input time and output time from a time point at which current sensor 2 has failed. Hence, the accumulated value of the output time is the count value of the output time of the output time counter and the accumulated value of the input time means the count value of the input time of the input time counter.

At a step S109, the accumulated value of the output time and the accumulated value of the input time are compared with each other in order for input/output managing unit 4 to determine whether a difference between both of the accumulated values of the input time and output time falls within a predetermined allowance range (which is smaller than a predetermined upper limit value but equal to or larger than a predetermined lower limit value). The accumulated value of the input power is generally proportional to the input time and the accumulated value of the input power is generally proportional to the output time. Hence, if the difference between the accumulated value of the output time and the accumulated value of the input time falls within a predetermined allowance range, it can be thought that a difference of energies discharged from secondary battery 1 and charged into secondary battery 1 is held within a predetermined range. That is to say, it can be considered that a variation of the SOC in secondary battery 1 is held within a predetermined range. Therefore, if "Yes" (the count difference is equal to or smaller than a predetermined value) at step S109, the routine returns to step S107 to continue the remaining control without change. If "No" at step S109, the routine returns to step S106 at which the input power limitation value and the output power limitation value (hereinafter, generally referred to as input/output power limitation values) are modified.

For example, in a case where a value of the subtraction of the accumulated value of the input time from the accumulated value of the output time is equal to or larger than the predetermined upper limit value, it can be thought that the charge quantity is large and the SOC is reduced. Thus, at step S106, the input power limitation value is set to the allowable input power and the set value of the output power limitation value is a value which is smaller than the allowable output power and is smaller than the input power limitation value. Thus, secondary battery 1 is controlled to be mainly dependent upon the charge into secondary battery 1 with the allowance of the large input power and the limitation of the output power to the small value. On the contrary, in a case where the value of subtraction of the accumulated value of the input time from the accumulated value of the output time is smaller than a predetermined lower limit value, it can be considered that the quantity of charge is increased and the SOC is increased. At step S106, the value of the output power limitation value is set to the allowable output power and the set value of the input power limitation value is a value which is smaller than the value of the allowable input power and is smaller than the output power limitation value. Thus, the control described above permits the input/output powers to be limited to be equal to or smaller than the allowable input/output powers with the variation in the SOC suppressed. It should be noted that, in the above described case, if the accumulated value of the input time subtracted from the accumulated value of the output time is equal to or smaller than the predetermined upper limit value, the input power limitation value is set to the allowable input power and the set value of the output power limitation value is smaller than the allowable input power, the set value of the output power limitation value is smaller than the allowable output power and is smaller than the input power limitation value. This is because the input/output control of secondary battery 1 is controlled mainly in the charge purpose. The output power limitation value may be set to be smaller than the input power limitation value. Hence, it is not necessary to set the input power limitation value to always be set to the same value as the allowable input power. Similarly, in a case where a value of subtraction of the accumulated value of the input time from the accumulated value of the output time is smaller than a predetermined lower limit value, it is not always necessary to set the value of the output power limitation value to the allowable output power.

It should be noted that in the above-described example, the variation in the SOC is suppressed by falling the difference between the accumulated values of the input time and the output time within the predetermined allowance range and the SOC of secondary battery 1 is in a range from a value equal to or smaller than the upper limit value SOC and equal to or larger than the lower limit value SOC. Hence, the predetermined allowance range is set by deriving such a range that the SOC of secondary battery 1 is equal to or smaller than upper limit SOC and equal to or larger than the lower limit SOC empirically.

FIGS. 6A, 6B, and 6C show examples of variations in the terminal voltage and the charging and discharging powers (input/output powers) in a case where the above-described control shown in FIG. 2 or FIG. 3 is performed. As shown in FIGS. 6A, 6B, and 6C, after the failure in current sensor 2, during a count A0 as shown in FIG. 6B, the discharge is carried out so that the terminal voltage shown in FIG. 6A is gradually reduced. Thereafter, during a count B0, the charge is carried out so that the terminal voltage is raised as shown in FIG. 6A, and, thereafter, during a count A1, the discharge is carried out so that the terminal voltage again indicates a tendency of reduction as shown in FIG. 6A.

A table shown in FIG. 6C indicates allowable ranges of the difference between an output count value (corresponds to an accumulated value of the discharge time) with respect to the terminal voltage of secondary battery 1 and an input count value (corresponds to an accumulated value of the charge time). For example, in a case where the terminal voltage of secondary battery 1 ranges from 400 volts to 350 volts, a value of the subtraction of the input count value from the output count value may be 250 or more but smaller than 500 (within a predetermined allowance (or allowable) range). It should be noted that an internal resistance of secondary battery 1 is varied in accordance with the SOC so that, even in the case of the same input power or the same output power, the variations in the terminal voltage with respect to the variations in the SOC are often different. To cope with this problem, it is desirable to modify the predetermined allowance range in accordance with the terminal voltage, as described in FIG. 6C.

Figure 4:
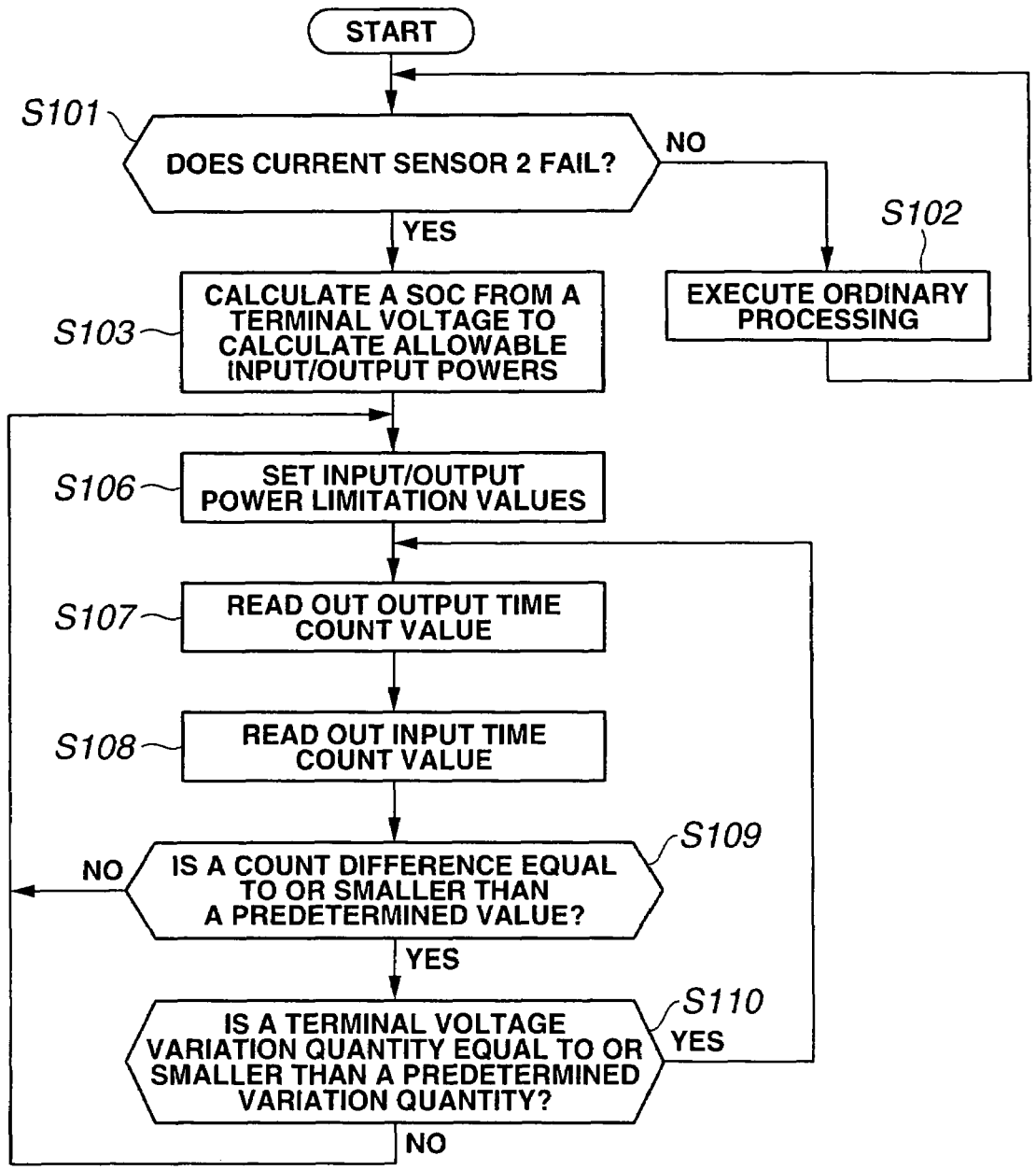
FIG. 4 is a flowchart representing a third example of the processing flowchart executed in the input/output managing unit of the input/output power control apparatus shown in FIG. 1.

Next, FIG. 4 shows a third example of the calculation contents of the input/output managing unit 4. The processing described in the flowchart shown in FIG. 4 is started in response to the system activation, as in the case of the flowchart shown in FIG. 3, and is repeated until the system is stopped. In FIG. 4, steps S101 through S109 are the same as those shown in FIG. 3 and only a step S110 is added. Hence, the detailed explanations as those steps as the same as the example shown in FIG. 3 are omitted and the explanation is only limited to a step S110. At step S110, input/output managing unit 4 determines whether a variation quantity of the terminal voltage of secondary battery 1 from a time point at which the processing of this step S110 is carried out to a time point at which the present processing of step S110 is carried out is equal to or smaller than a predetermined variation quantity. If the variation quantity of the terminal voltage is larger than the predetermined variation quantity (No) at step S110, even if the difference in the accumulated values of the counts is within the predetermined range, the routine returns to step S106 at which the set values of the input/output power limitation values are modified. As described hereinabove, the irreversible deterioration is developed due to the excessive charge in which the SOC is equal to or larger than the predetermined upper limit SOC or due to the excessive discharge in which the SOC is equal to or smaller than the predetermined lower limit SOC. In addition to such an excessive charge or excessive discharge as described above, the irreversible deterioration is developed even in a case where the terminal voltage becomes excessively high or becomes excessively low. In other words, for example, if the variation quantity of the terminal voltage is large with the internal resistance of secondary battery 1 extremely increased due to a deterioration of secondary battery 1 or due to an extremely low temperature thereof, there is a possibility of the development of the irreversible deterioration in secondary battery 1 even if the SOC is larger than the predetermined lower limit SOC but is smaller than the predetermined upper limit SOC. It is desirable to prevent the irreversible deterioration from occurring by decreasing the input power limitation value and the output power limitation value in a case where the variation quantity of the terminal voltage is extremely large as described in the case of the third example shown in FIG. 4 (protection of the secondary battery).

Figure 5:
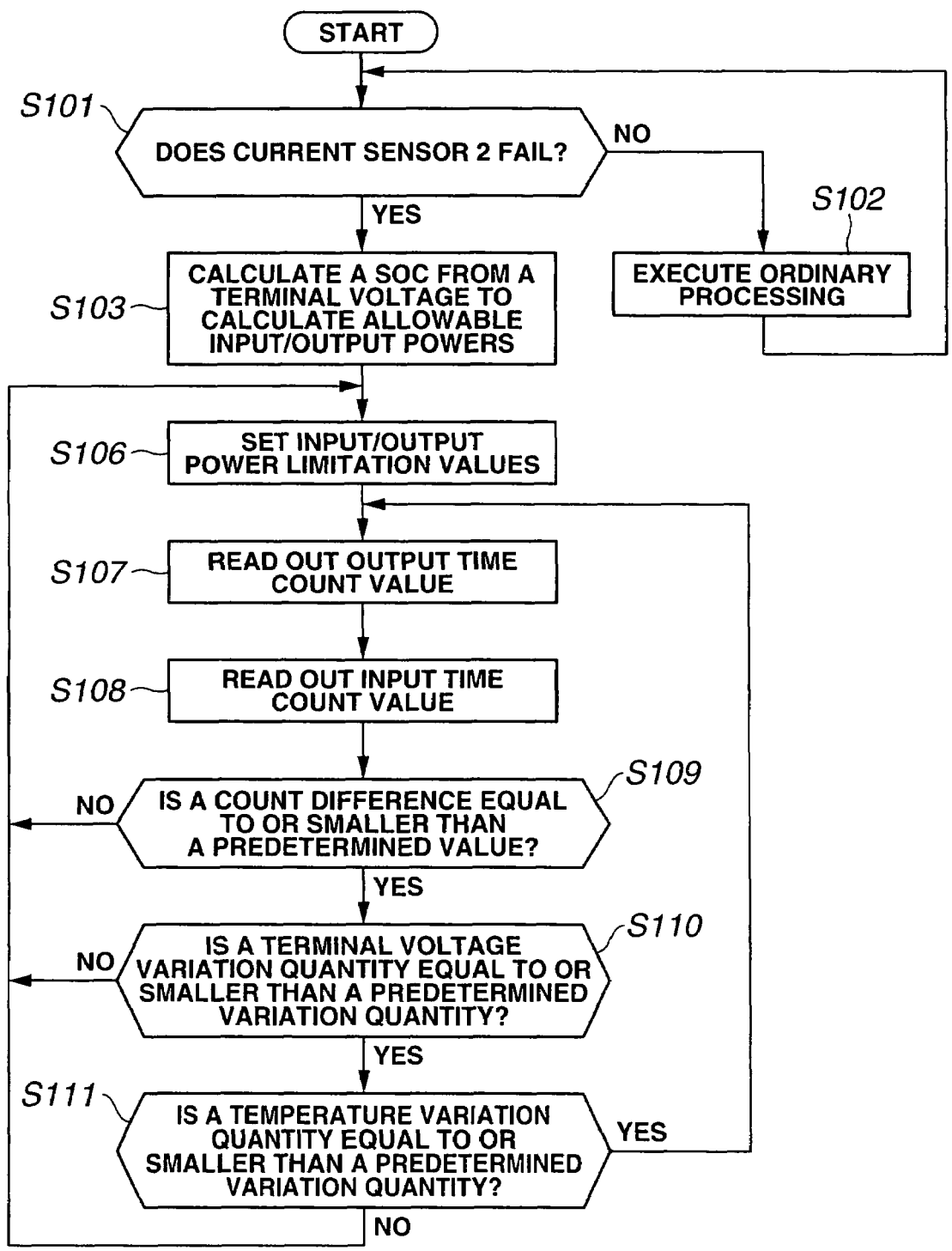
FIG. 5 is a flowchart representing a fourth example of the processing flowchart executed in the input/output managing unit of the input/output power control apparatus shown in FIG. 1.

Next, FIG. 5 shows a flowchart representing a fourth example of the calculation contents executed in input/output managing unit 4. The processing described in the flowchart shown in FIG. 5 is started in response to the system activation, in the same way as described in the flowchart shown in FIG. 4, and is repeated until the system is stopped. In FIG. 5, steps S101 through S110 are the same as those shown in FIG. 4 and a step S111 is herein added. At step S111, input/output managing unit 4 determines whether a temperature variation quantity of secondary battery 1 from a time point at which the processing of step S111 is executed to a time point at which the present processing of step S111 is executed is equal to or lower than a predetermined (temperature) variation quantity on the basis of the temperature of secondary battery 1 detected by a temperature sensor (not shown in FIG. 1) installed in secondary battery 1. If the temperature variation quantity is larger than the predetermined variation quantity (No) at step S111, the routine returns to step S106 at which the set values of the input/output power limitation values are modified. The temperature of the secondary battery is easy to be more raised as the internal resistance thereof becomes larger. That is to say, in a case where the temperature variation quantity of secondary battery 1 is larger than a predetermined variation quantity, the internal resistance of secondary battery 1 is extremely increased and, in the way as described above, there is a possibility of the terminal voltage being extremely raised or extremely reduced. Hence, in a case where the temperature variation is larger than the predetermined temperature variation quantity, the input power limitation value and output power limitation value (input/output power limitation values) are decreased in the same way as the third example. Thus, the development of the irreversible deterioration in the secondary battery can desirably be prevented from occurring (the secondary battery is protected). It should be noted that, in FIG. 5, in a case where the variation quantity of the terminal voltage is equal to or smaller than the predetermined variation quantity, the input/output managing unit 4 determines whether the variation quantity of the temperature is equal to or smaller than the predetermined variation quantity. Alternatively, if the variation quantity of the temperature is equal to or smaller than the predetermined variation quantity, input/output managing unit 4 may determine whether the variation quantity of the terminal voltage is equal to or smaller than the predetermined variation quantity. Or alternatively, input/output managing unit 4 may determine only whether the variation quantity of the temperature is equal to or smaller than the predetermined variation quantity. In addition, in these examples shown in FIGS. 2 through 5, the case where current sensor 2 has failed has herein been described. However, in a case where voltage sensor 3 has failed, the same control using the current value detected by the current sensor may be used and the combination of these may be achieved. That is to say, voltage sensor failure detecting means (a voltage sensor failure detecting section) is provided for detecting the failure in the voltage sensor. When the failure in voltage sensor 3 is detected, the allowable input/output powers of the secondary battery are calculated on the basis of the input and/or output current detected by the current sensor and the input/output powers of the secondary battery can be limited to values equal to or smaller than the allowable input/output powers. In a case where either current sensor 2 or voltage sensor 3 fails, the input/output powers of the secondary battery may be limited to a value equal to or smaller than the allowable input/output powers on the basis of the detected value of one of the current and voltage sensors which does not fail. Hereinafter, a specific example of these will be explained with the difference from the first to the fourth examples as a center.

Figure 7:
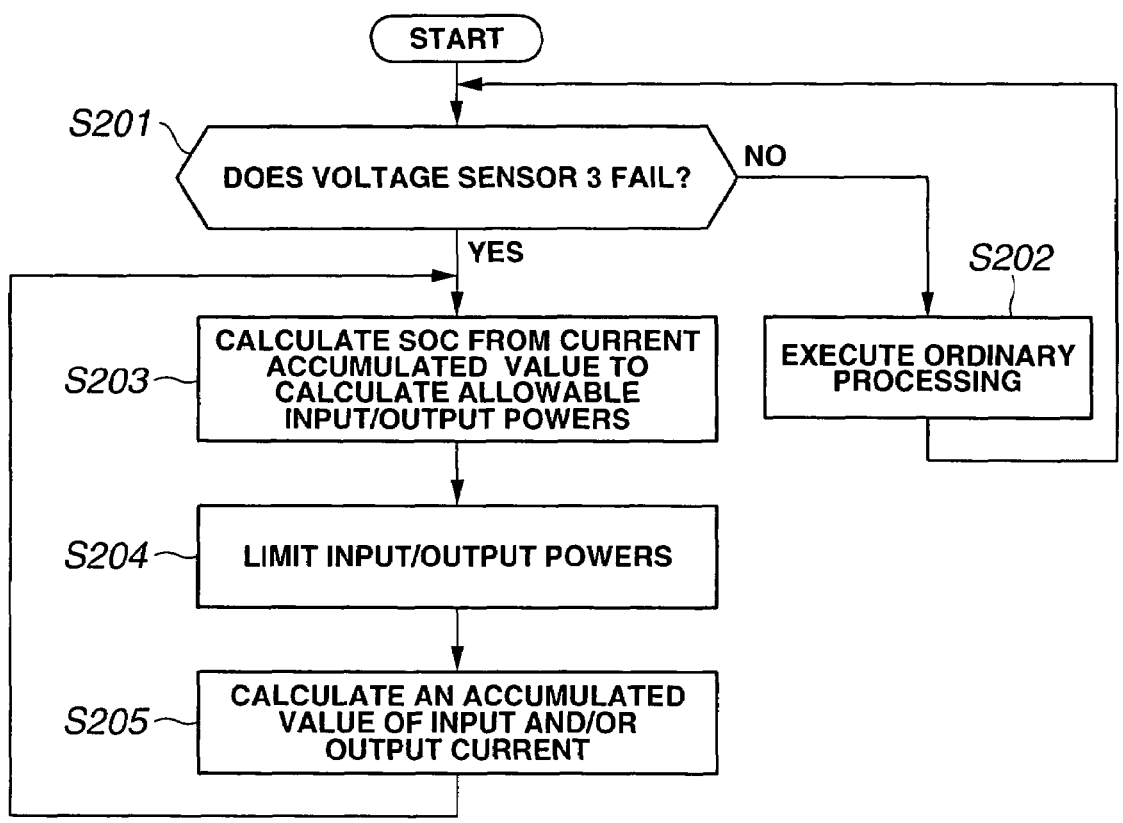
FIG. 7 is a flowchart representing a fifth example of the processing flowchart executed in the input/output managing unit of the input/output power control apparatus shown in FIG. 1.

FIG. 7 shows a processing flowchart representing a fifth example of the calculation (processing) contents executed in input/output managing unit 4. It should be noted that the processing shown in the flowchart of FIG. 7 is started in response to the system activation and is repeated until the system is stopped, in the same way as described above. In FIG. 7, at a step S201, input/output managing unit 4 determines (detects) whether voltage sensor 3 has failed. It should herein be noted that a failure determination (detection) method of voltage sensor 3 may be considered as follows:

(1) In a case where the detected voltage by voltage sensor 3 is continued at a constant value for a predetermined time or longer, input/output managing unit 4 determines (detects) that voltage sensor 3 fails. For example, in a case where a breakage in connection between voltage sensor 3 and secondary battery 1 occurs or in a case where a connection line between the input/output managing unit 4 and voltage sensor 3 is broken, the detected voltage of voltage sensor 3 is fixed to a constant voltage. Thus, in each of these cases, input/output managing unit 4 determines (detects) the failure in voltage sensor 3 since the detected voltage of voltage sensor 3 is fixed to the constant value.

(2) The failure in voltage sensor 3 is carried out by comparing the detected voltage of voltage sensor 3 with an input voltage into inverter 8 detected by voltage sensor 10. Since the electric power is supplied to a feeder from secondary battery 1 to inverter 8 and the feeder is ordinarily installed with a relay, a resistor, and so forth therein, a voltage drop occurs between secondary battery 1 and inverter 8. Therefore, ordinarily, the input voltage of inverter 8 is lower than the terminal voltage of secondary battery 1. Hence, in a case where the voltage detected by voltage sensor 3 is lower than the voltage detected by other voltage sensor 10, input/output managing unit 4 determines (detects) that the failure in voltage sensor 3 occurs.

In a case where input/output managing unit 4 does not determine the failure in voltage sensor 3 (No) at step S201, the routine goes to a step S202 at which the ordinary processing is executed. It should be noted that the processing at step S202 in the flowchart of FIG. 7 is the same processing as step S102 shown in each of FIGS. 1 through 5. Hence, the detailed explanation of the processing contents at step S202 will herein not be made. On the other hand, if input/output managing unit 4 determines (detects) that voltage sensor 3 has failed (Yes) at step S201, the routine goes to a step S203 at which the SOC of secondary battery 1 is calculated and is stored in the memory. Then, at same step S203, in the same way as step S103 of the flowchart shown in each of FIGS. 1 through 5, the allowable input/output powers are calculated on the basis of the calculated SOC, the upper limit SOC, and the lower limit SOC. At this step S203, due to the failure in voltage sensor 3, the SOC of secondary battery 1 cannot be calculated on the basis of the terminal voltage detected by voltage sensor 3 in the way as described at step S103 of flowchart shown in each of FIGS. 1 through 5. Hence, at this step S203, input/output managing unit 4 calculates the SOC from the SOC of secondary battery 1 previously stored in the memory before voltage sensor 3 has failed and the input/output current accumulated value (the accumulated value of the input current and/or output current with the input current as a positive and with the output current as a negative from the time point at which voltage sensor 3 has failed). That is to say, in a case where voltage sensor 3 has failed, a first time (an initial) calculation of the SOC is an addition of the SOC corresponding to the input and/or output current accumulated value in which the input and/or output current of secondary battery 1 detected by current sensor 2 is accumulated from a time point at which voltage sensor 3 has failed to the SOC of secondary battery 1 stored in the memory before the failure in voltage sensor 3 to calculate and store the SOC. Thereafter, the SOC is calculated by adding the SOC corresponding to the input and/or output current accumulated value from the time point at which the previous SOC is calculated and stored to the time point at which the present SOC is calculated (in this example, for an interval of time about 100 milliseconds) to calculate the present SOC. It should be noted that, in this case, detection errors of current sensor 2 are accumulated in the input and/or output current accumulated value and, thus, there is a possibility of the occurrence in the error between the actual SOC and the calculated SOC. Hence, with the occurrence in this error taken into consideration, in the same way as step S103, the upper limit SOC in this example is preferably set to a value lower than the upper limit SOC when voltage sensor 3 is normal and the lower limit SOC in this example is preferably set to a value higher than the lower limit SOC when voltage sensor 3 is normal. At the next step S204, input/output managing unit 4 commands motor control unit 7 for the actual input/output powers of secondary battery 1 (the consumed power and the regenerated power of motor 9) not to exceed the allowable input/output powers in the same way as step S104 in the flowchart of FIG. 2. At the next step S205, input/output managing unit 4 calculates the current accumulated value (the accumulated value of the current (input and/or output current) detected by current sensor 2) of secondary battery 1 from the time point at which the previous SOC is calculated to the time point at which the present SOC is calculated. Then, the routine returns to step S203 to calculate the SOC to calculate the allowable input/output powers (allowable input power and allowable output power). Described hereinabove is the processing of the fifth example of the calculation contents in input/output managing unit 4.

Figure 8:
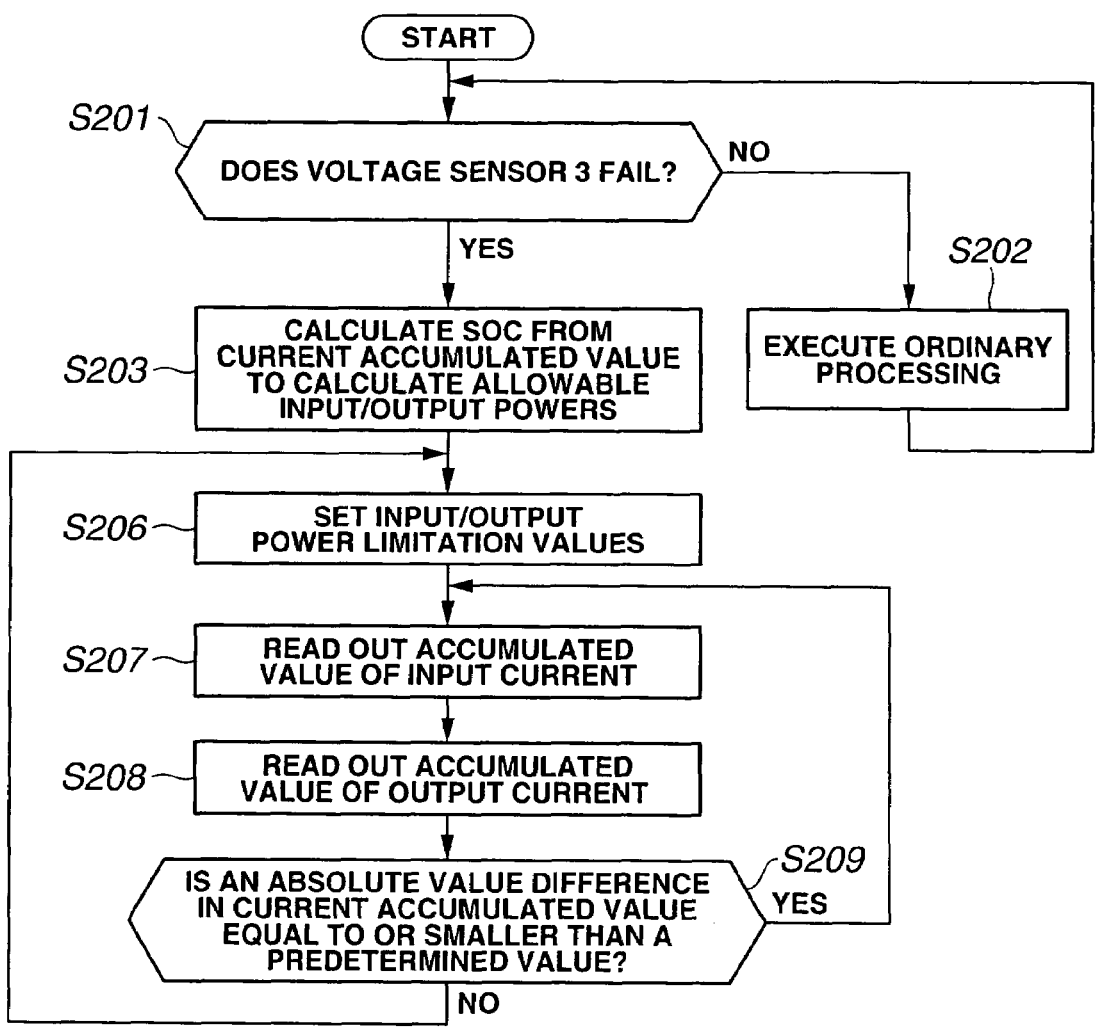
FIG. 8 is a flowchart representing a sixth example of the processing flowchart executed in the input/output managing unit of the input/output power control apparatus shown in FIG. 1.

Next, a sixth example of the calculation (processing) contents of input/output managing unit 4 will be described with reference to the flowchart shown in FIG. 8. The processing of the flowchart shown in FIG. 8 is started in response to the system activation and is repeated until the system is stopped in the same way as each of the first to fifth examples described above. Since the processing contents of steps S201 through S203 are the same as those described with reference to the flowchart shown in FIG. 7, the detailed description thereof will herein be omitted. At a step S206, input/output managing unit 4 sets the input/output power limitation values on the basis of the calculated allowable input/output powers, respectively, in the same way as the step S106 shown in FIG. 3. At a step S207, input/output managing unit 4 reads out the accumulated value of the input (charge) current of secondary battery 1 from the time point at which voltage sensor 3 has failed which is accumulated by an input current accumulating portion (not shown) on the basis of the input and/or output current of secondary battery 1 detected by current sensor 2 as an input current accumulated value. It should be noted that, in this example, the input current of secondary battery 1 is assumed to take a positive value and the output current thereof is assumed to take a negative value. At a step S208, the accumulated value of the output current (discharge current) of secondary battery 1 from the time point at which voltage sensor 3 fails which is detected by an output current accumulated portion (not shown) is read out (ascertained) as an output current accumulated value. At a step S209, input/output managing unit 4 subtracts an absolute value of the input current accumulated value from the absolute value of the output current accumulated value to calculate a difference between the absolute values of the output current accumulated value and of the input current accumulated value to determine whether the calculated absolute value difference is equal to or smaller than a predetermined value. If the calculated absolute value difference is equal to or smaller than the predetermined value (Yes) at step S209, the routine returns to step S207. If the calculated absolute value difference is larger than the predetermined value (No) at step S209, the routine returns to step S206. At step S206, the input/output power limitation values are modified. For example, since in a case where a value of the subtraction of the input current accumulated value from the output current accumulated value is equal to or larger than a predetermined upper limit value, it may be considered that the quantity of the discharge is large and the SOC is reduced. Hence, at step S206, the set value of the output power limitation value is made smaller than the allowable output power by a predetermined value and the input power limitation value is set to the allowable input power to perform a main control over the charge of secondary battery 1. On the contrary, in a case where a value of the subtraction of the input current accumulated value from the output current accumulated value is smaller than a predetermined lower limit value, it may be considered that the quantity of charge is large and the SOC is increased. Hence, in this case, at step S206, the set value of the input power limitation value is made smaller than the allowable input power by a predetermined value and the output power limitation value is set to the allowable output power. Thus, input/output managing unit 4 performs the main control of discharge over secondary battery 1. Such a series of controls as described above suppresses the variation in the SOC and the input/output (input-and-output) powers of secondary battery 1 can be limited to be equal to or smaller than the allowable input/output powers, respectively.

Figure 9:
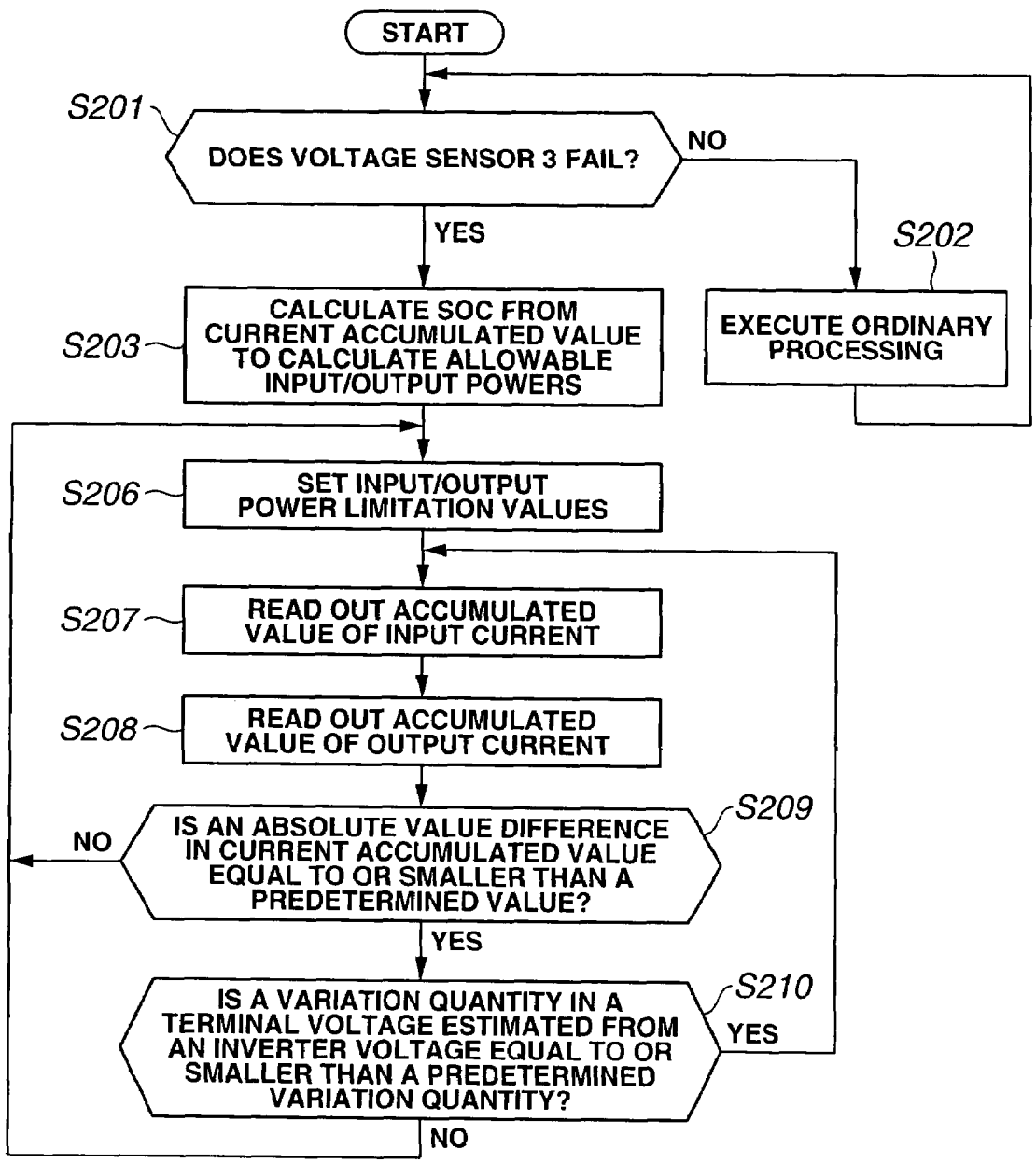
FIG. 9 is a flowchart representing a seventh example of the processing flowchart executed in the input/output managing unit of the input/output power control apparatus shown in FIG. 1.

Next, a seventh example of the calculation (processing) contents in input/output managing unit 4 will be described with reference to FIG. 9. The processing of the flowchart shown in FIG. 9 is started in response to the system activation and is repeated until the system is stopped, in the same way as each of the first to sixth examples described above. The processing from step S201 to step S209 in the flowchart shown in FIG. 9 is the same as the processing flowchart at steps S201 to S209 described in the flowchart of FIG. 8. Hence, the detailed explanation thereof will herein be omitted. At a step S210, input/output managing unit 4 estimates the terminal voltage of secondary battery 1 from the detected value of other voltage sensor 10 installed in inverter 8 and determines (detects) whether a variation quantity of the estimated terminal voltage by voltage sensor 10 is equal to or smaller than a predetermined variation quantity. For example, during the drive of motor 9, a value of the detected value of voltage sensor 10 in inverter 8 multiplied by a correction coefficient (a value larger than 1, for example, 1.3) is set as the terminal voltage of secondary battery 1. During the regeneration, a value of the detected value of voltage sensor 10 in inverter 8 multiplied by the correction coefficient (a value smaller than 1, for example, 0.8) is estimated as the terminal voltage of secondary battery 1. On the basis of the estimated terminal voltage of secondary battery 1, input/output managing unit 4 determines (detects) whether the variation quantity of the terminal voltage of secondary battery 1 is equal to or smaller than the predetermined variation quantity, in the same way as step S110 in the flowchart of FIG. 4. If the variation quantity of the estimated terminal voltage of secondary battery 1 is larger than the predetermined variation quantity, the routine returns to step S206. In the same way as step S106 in FIG. 4, input/output managing unit 4 decreases the input power limitation value and the output power limitation value in the same way as step S106 in FIG. 4 to prevent the development of the irreversible deterioration in the secondary battery (the secondary battery is protected).

Figure 10:
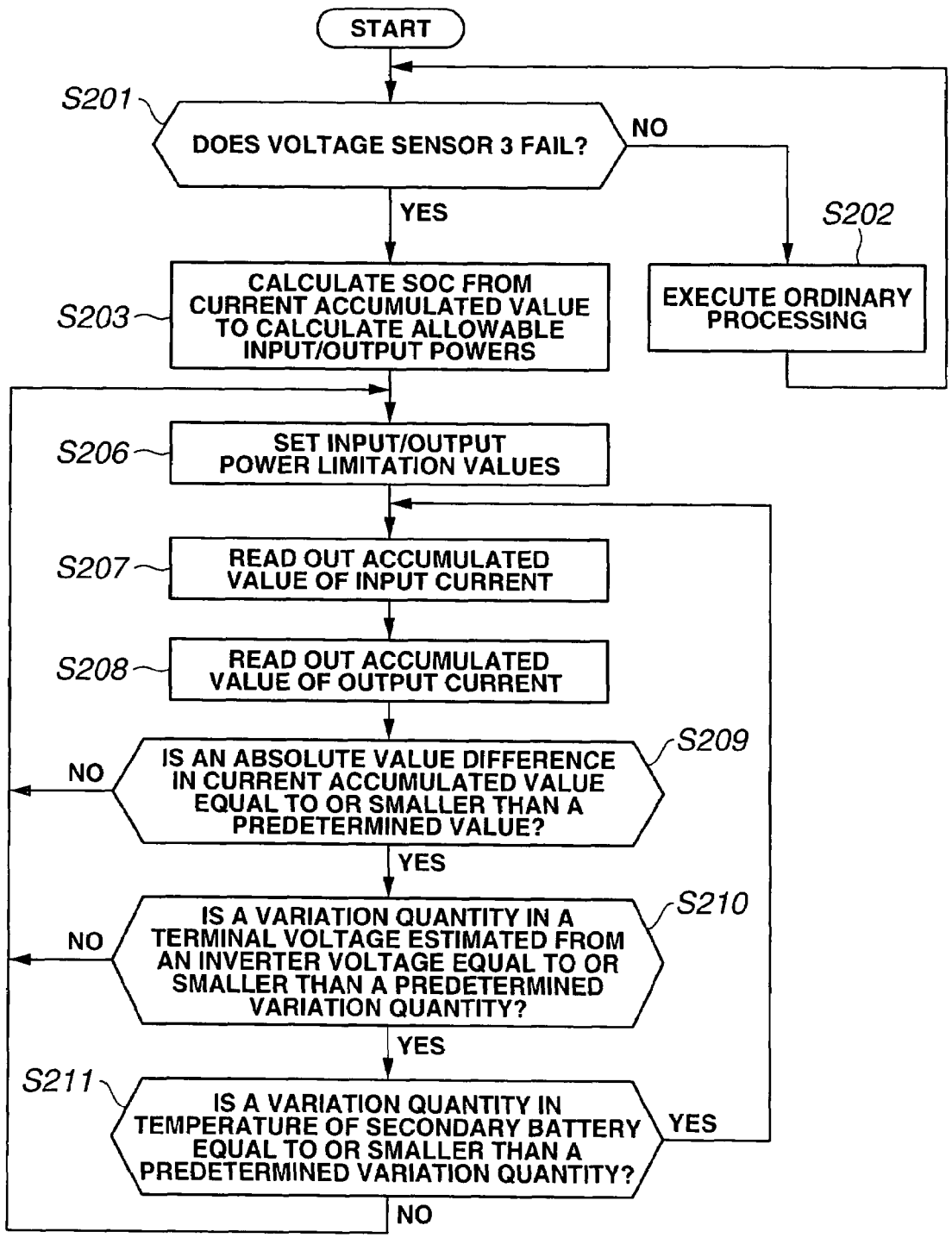
FIG. 10 is a flowchart representing an eighth example of the processing flowchart executed in the input/output managing unit of the input/output power control apparatus shown in FIG. 1.

Next, an eighth example of the calculation (processing) contents in input/output managing unit 4 will be described below with reference to a flowchart shown in FIG. 10. It should be noted that, in the same way as the seventh example described above, the routine shown in FIG. 10 is started in response to the activation of the system and is repeated until the stop of the system. The processing of the steps from step S201 to step S210 is the same as the same steps shown in FIG. 9. Thus, the detailed explanation thereof will herein be omitted. At a step S211 in FIG. 10, input/output managing unit 4 determines whether a temperature variation of secondary battery 1 is equal to or smaller than a predetermined variation quantity on the basis of the temperature of secondary battery 1 detected by the temperature sensor (omitted in FIG. 1) installed in secondary battery 1 in the similar manner as step S111 (in FIG. 5). If the variation quantity of the temperature of secondary battery 1 is larger than the predetermined variation quantity, the routine returns to step S206 at which the input power limitation value and the output power limitation value are decreased to prevent the development of the irreversible deterioration in secondary battery 1 (secondary battery 1 is protected). It should be noted that, in the same way as the fourth example described above, in the eighth example shown in FIG. 10, in a case where the variation quantity of the temperature of secondary battery 1 is equal to or smaller than the predetermined variation quantity, whether the variation quantity of the terminal voltage is equal to or smaller than the predetermined variation quantity may be determined. Or alternatively, the determination of whether the variation quantity of the temperature of secondary battery is equal to or smaller than the predetermined variation quantity may only be made (namely, step S210 in FIG. 10 may be omitted).

Next, a ninth example of the calculation (processing) contents in input/output managing unit 4 will be described with reference to the flowchart of FIG. 11. It should be noted that, in the same way as the seventh example described above, the routine shown in FIG. 11 is started in response to the system activation and is repeated until the system is stopped.

Figure 11:
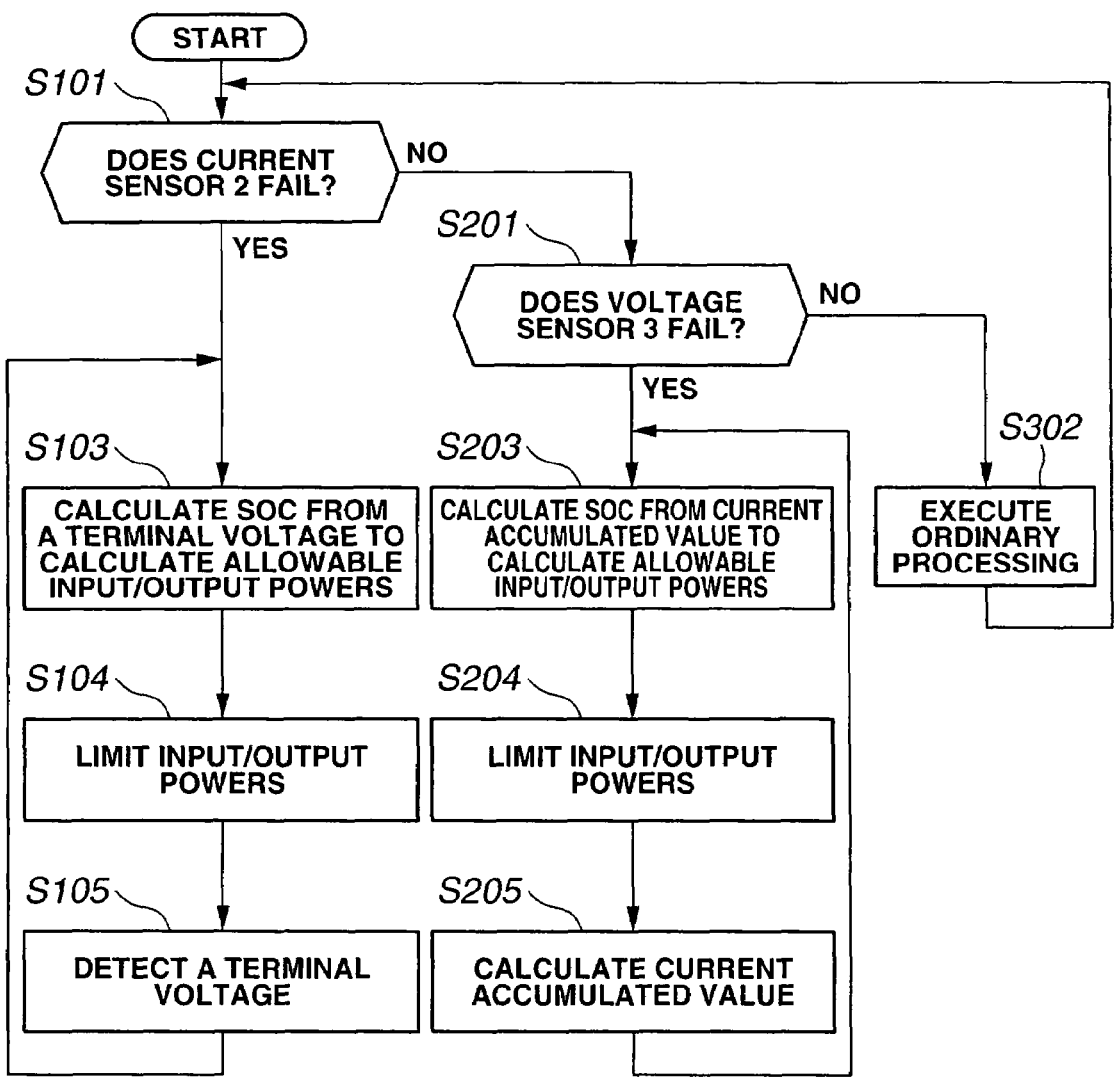
FIG. 11 is a flowchart representing a ninth example of the processing flowchart executed in the input/output managing unit of the input/output power control apparatus shown in FIG. 1.

At step S101 of FIG. 11, the input/output managing unit 4 determines (detects) whether the failure in current sensor 2 occurs in the same way as step S101 described in the flowchart shown in each of FIGS. 2 to 5. If current sensor 2 is determined (detected) to fail, the routine goes to step S103. The same processing as steps S103 through S105 is carried out in the same way as described with reference to FIG. 2. On the other hand, if current sensor 2 is determined (detected) not to fail, the routine goes to step S201 at which input/output managing unit 4 determines whether the failure in voltage sensor 3 occurs in the same way as step S201 described in each of the flowcharts shown in FIGS. 7 to 10. If the failure in voltage sensor 3 is determined (detected) to occur, the routine goes to step S203 at which the same series of processing as steps S203 through S205 as shown in the flowchart of FIG. 7 is carried out. On the other hand, if voltage sensor 3 is not determined to fail, the routine goes to a step S302 at which the ordinary processing as step S102 described in each of the flowcharts shown in FIGS. 2 through 5 and as step S202 described in each of the flowcharts shown in FIGS. 7 through 10 is executed.

That is to say, in the ninth example shown in FIG. 9, the processing described in the flowchart shown in FIG. 2 is combined with the processing described in the flowchart shown in FIG. 7. Input/output managing unit 4 determines (detects) either of which of current sensor 2 and voltage sensor 3 has failed. If current sensor 2 is determined (detected) to fail, the processing shown in FIG. 2 is executed. If voltage sensor 3 has failed, the processing shown in FIG. 7 is executed. If neither current sensor 2 nor voltage sensor 3 is determined (detected) to fail, the ordinary processing is executed at step S302. Hence, even in a case where either of current sensor 2 or voltage sensor 3 has failed, secondary battery 1 can be protected without an extreme reduction in the performance of the vehicle in which the input/output power control apparatus according to the present invention is mounted. In the ninth example shown in FIG. 11, the combination of the processing shown in the flowchart of FIG. 2 with the processing shown in the flowchart of FIG. 7 has been described. The present invention is not limited to this. Any one of the processing shown in each of the flowcharts shown in FIGS. 2 through 5 may be combined with any one of the processing shown in the flowcharts shown in FIGS. 7 to 10. Thus, the same advantages as the combination of the processing shown in FIGS. 2 and 7 can be obtained.

It should be noted that the above-described embodiment are described in order to facilitate a better understanding of the present invention and do not limit the scope of the present invention. Hence, each essential element disclosed in the above-described embodiments includes all design modifications and equivalents belonging to the scope of the present invention. This application is based on prior Japanese Patent Applications No. 2006-191658 and No. 2007-172121. The entire contents of Japanese Patent Applications No. 2006-191658 and No. 2007-172121 with filing dates of Jul. 12, 2006 and Jun. 29, 2007 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An input/output power control apparatus for a secondary battery, comprising:
   a current sensor configured to detect an input and/or output current of the secondary battery;
   a voltage sensor configured to detect a terminal voltage of the secondary battery;
   a sensor failure detecting section configured to detect at least one of failures in the current sensor and in the voltage sensor;

an allowable input/output power calculating section configured to calculate an allowable input power by which the secondary battery allowably inputs and an allowable output power by which the secondary battery allowably outputs in a form of allowable input/output powers on the basis of the terminal voltage detected by the voltage sensor and the input and/or output current of the secondary battery detected by the current sensor, in a case where the sensor failure detecting section detects the failure in neither the current sensor nor the voltage sensor, and to calculate the allowable input/output powers on the basis of a detected value of one of the current sensor and the voltage sensor in which the sensor failure detecting section detects no failure, in a case where the failure detecting section detects the failure in either one of the current sensor and the voltage sensor; and an input/output power control section configured to limit each of input and output powers of the secondary battery to a value equal to or smaller than the corresponding one of the allowable input/output powers calculated by the allowable input/output power calculating section.

2. The input/output power control apparatus as claimed in claim 1, wherein the sensor failure detecting section comprises a current sensor failure detecting section configured to detect the failure in the current sensor and the allowable input/output power calculating section is configured to calculate the allowable input/output powers of the secondary battery from the terminal voltage detected by the voltage sensor, in a case where the failure in the current sensor is detected by the current sensor failure detecting section.

3. The input/output power control apparatus as claimed in claim 1, wherein the sensor failure detecting section comprises a voltage sensor failure detecting section configured to detect the failure in the voltage sensor and the allowable input/output power calculating section is configured to detect a residual capacity of the secondary battery on the basis of the residual capacity of the secondary battery before the voltage sensor is detected to fail and an accumulated value of the input and/or output current of the secondary battery detected by the current sensor from a time point at which the voltage sensor fails and to calculate the allowable input/output powers of the secondary battery on the basis of the detected residual capacity.

4. The input/output power control apparatus as claimed in claim 1, wherein the sensor failure detecting section is configured to detect the failures in the current sensor and in the voltage sensor and the allowable input/output power calculating section is configured to calculate the allowable input/output powers from the terminal voltage detected by the voltage sensor, in a case where the sensor failure detecting section detects the failure in the current sensor, and to detect a residual capacity of the secondary battery on the basis of the residual capacity before the failure in the voltage sensor and an accumulated value of the input and/or output current of the secondary battery detected by the current sensor from a time point at which the voltage sensor fails and to calculate the allowable input/output powers of the secondary battery on the basis of the detected residual capacity, in a case where the failure in the voltage sensor is detected.

5. The input/output power control apparatus as claimed in claim 2, wherein the allowable input/output power calculating section is configured to calculate the residual capacity of the secondary battery from the terminal voltage detected by the voltage sensor and to calculate the allowable input/output powers on the basis of the calculated residual capacity of the secondary battery, in a case where the failure in the current sensor is detected.

6. The input/output power control apparatus as claimed in claim 2, wherein the allowable input/output power calculating section is configured to previously store a correlation between the allowable input/output powers of the secondary battery and the terminal voltage of the secondary battery and to calculate the allowable input/output powers on the basis of the terminal voltage detected by the voltage sensor and the correlation between the allowable input/output powers and the terminal voltage of the secondary battery, in a case where the failure in the current sensor is detected.

7. The input/output power control apparatus as claimed in claim 3, wherein the allowable input/output power calculating section is configured to calculate the allowable input/output powers on the basis of the detected residual capacity of the secondary battery and a difference in the residual capacity between a predetermined residual capacity upper limit value and a predetermined residual capacity lower limit value.

8. The input/output power control apparatus as claimed in claim 2, wherein the input/output power control apparatus further comprises; an output time detection section configured to detect an accumulated value of an output time for which the power is outputted from the secondary battery from a time point at which the failure in the current sensor is detected; and an input time detecting section configured to detect an accumulated value of an input time for which the power is inputted to the secondary battery from the time point at which the failure in the current sensor is detected and wherein the input/output power control section is configured to limit the input power of the secondary battery to be equal to or smaller than an input power limitation value which is equal to or smaller than the allowable input power and to limit the output power of the secondary battery to be equal to or smaller than an output power limitation value which is smaller than the allowable output power and is smaller than the input power limitation value, in a case where the accumulated value of the output time is larger than the accumulated value of the input time by a predetermined time or more, and the input/output power control section is configured to limit the output power of the secondary battery to be equal to or smaller than the input current limitation value which is an electric power equal to or smaller than the allowable output power and to limit the input power of the secondary battery to be equal to or smaller than the input power limitation value which is smaller than the allowable input power and is smaller than the output power limitation value, in a case where the accumulated value of the input time is larger than the accumulated value of the output time by another predetermined time or more.

9. The input/output power control apparatus as claimed in claim 3, wherein the input/output power control apparatus further comprises: an output current accumulated value detecting section configured to detect an output current accumulated value which is an accumulated value of the output current from the secondary battery from a time point at which the failure in the voltage sensor is detected; and an input current accumulated value detecting section configured to detect an input current accumulated value which is the accumulated value of the input current to the secondary battery from the time point at which the failure in the voltage sensor is detected and wherein the input/output power control section is configured to limit the input power of the secondary battery to be equal to or smaller than an input power limitation value which is a power equal to or smaller than the allowable input power and to limit the output power of the secondary battery to be equal to or smaller than an output power limitation value which is smaller than the allowable output power and is smaller than the input current limitation value, in a case where the output current accumulated value is larger than the input current accumulated value by a predetermined value or more, and the input/output power control section is configured to limit the output power of the secondary battery to be equal to or smaller than the input power limitation value which is the power equal to or smaller than the allowable output power and to limit the input power of the secondary battery to be equal to or smaller than the input power limitation value which is smaller than the allowable input power and is smaller than the output power limitation value, in a case where the input current accumulated value is larger than the output current accumulated value by another predetermined value or more.

10. The input/output power control apparatus as claimed in claim 1, wherein the input/output power control apparatus further comprises a voltage variation quantity detecting section configured to detect a voltage variation quantity of the terminal voltage of the secondary battery and wherein the input/output power control section is configured to limit the input power of the secondary battery and the output power thereof to be powers which are smaller than the allowable input power and the allowable output power, respectively, in a case where the variation quantity of the terminal voltage of the secondary battery detected by the voltage variation quantity detecting section is larger than a predetermined variation quantity.

11. The input/output power control apparatus as claimed in claim 1, wherein the input/output power control apparatus further comprises a temperature variation quantity detecting section configured to detect a variation quantity of a temperature of the secondary battery and wherein the input/output power control section is configured to limit the input power and the output to be powers which are smaller than the allowable input power and the allowable output power, respectively, in a case where the detected temperature variation quantity detected by the temperature variation quantity detecting section is larger than a predetermined variation quantity.

12. The input/output power control apparatus as claimed in claim 1, wherein the sensor failure detecting section is configured to compare the current flowing through a load which is driven by a power supplied from the secondary battery with the current detected by the current sensor and to detect the failure in the current sensor when the current flowing through the load is larger than the current detected by the current sensor.

13. The input/output power control apparatus as claimed in claim 1, wherein the sensor failure detecting section is configured to compare another voltage inputted to a load driven by the power supplied from the secondary battery with a voltage detected by the voltage sensor and to detect the failure in the voltage sensor when the other voltage inputted to the load is larger than the voltage detected by the voltage sensor.

14. An input/output power control method for a secondary battery, comprising:
providing a current sensor configured to detect an input and/or output current of the secondary battery;
providing a voltage sensor configured to detect a terminal voltage of the secondary battery;
detecting at least one of failures in the current sensor and in the voltage sensor;
in a case where neither the current sensor nor the voltage sensor is detected to fail, calculating an allowable input power by which the secondary battery allowably inputs and an allowable output power by which the secondary battery allowably outputs in a form of the allowable input/output powers on the basis of the input and/or output current detected by the current sensor and the terminal voltage of the secondary battery detected by the voltage sensor and, in a case where the failure in either one of the current sensor and the voltage sensor is detected, calculating the allowable input/output powers on the basis of a detected value of one of the current and voltage sensors in which no failure is detected; and
limiting each of input and output powers of the secondary battery to be equal to or smaller than the corresponding one of the allowable input/output powers.

15. The input/output power control method as claimed in claim 14, wherein the method further comprises detecting whether the failure in the current sensor occurs and wherein, in a case where the failure in the current sensor is detected, the allowable input/output powers of the secondary battery are calculated from the terminal voltage detected by the voltage sensor.

16. The input/output power control method as claimed in claim 14, wherein the method further comprising detecting whether the failure in the voltage sensor occurs and wherein, in a case where the failure in the voltage sensor is detected, a residual capacity of the secondary battery is detected on the basis of the residual capacity before the failure in the voltage sensor is detected and an accumulated value of the input and/or output current of the secondary battery detected by the current sensor, and the allowable input/output powers of the secondary battery are calculated on the basis of the detected residual capacity.

17. The input/output power control method as claimed in claim 14, wherein the method further comprises detecting the failures of both of the current sensor and the voltage sensor occur and wherein, in a case where the failure in the current sensor is detected, the allowable input/output powers are calculated from the terminal voltage detected by the voltage sensor and, in a case where the failure in the voltage sensor is detected, a residual capacity of the secondary battery is detected on the basis of the residual capacity of the secondary battery before the failure in the voltage sensor is detected and an accumulated value of the input and/or output current detected by the current sensor from a time point at which the failure in the voltage sensor is detected, and calculating the allowable input/output powers on the basis of the detected residual capacity of the secondary battery.

18. The input/output power control method as claimed in claim 15, wherein, in a case where the failure in the current sensor is detected, a residual capacity of the secondary battery is calculated from the terminal voltage and the allowable input/output powers are calculated on the basis of the calculated residual capacity of the secondary battery.

19. The input/output power control method as claimed in claim 15, wherein a correlation between the allowable input/output powers of the secondary battery and the terminal voltage of the secondary battery is previously stored and, in a case where the failure in the current sensor is detected, the allowable input/output powers are calculated on the basis of the terminal voltage detected by the voltage sensor and the correlation between the terminal voltage detected by the voltage sensor and the allowable input/output powers of the secondary battery.

20. The input/output power control method as claimed in claim 16, wherein the allowable input/output powers of the secondary battery are calculated on the basis of the detected residual capacity of the secondary battery and a difference in the residual capacity between a predetermined residual capacity upper limit value and a predetermined residual capacity lower limit value.

21. The input/output power control method as claimed in claim 15, wherein, in a case where the failure in the current sensor is detected, the method further comprises detecting an accumulated value of an output time which is a time for which the power is outputted from the secondary battery from a time point at which the failure in the current sensor is detected and detecting another accumulated value of an input time which is a time for which the power is inputted to the secondary battery from the time point at which the failure in the current sensor is detected and, in a case where the accumulated value of the output time is larger than the accumulated value of the input time by a predetermined time or more, limiting the input power of the secondary battery to an input power limitation value which is equal to or smaller than the allowable input power and limiting the output power of the secondary battery to be equal to or smaller than an output power limitation value which is smaller than the allowable output power and is smaller than the input current limitation value, and, in a case where the accumulated value of the input time is larger than the accumulated value of the output time by another predetermined time or more, limiting the output power of the secondary battery to a value equal to or smaller than the input power limitation value which is the power equal to or smaller than the allowable output power and limiting the input power of the secondary battery to a value equal to or smaller than the input power limitation value which is smaller than the allowable input power and is smaller than the output power limitation value.

22. The input/output power control method as claimed in claim 16, wherein, in a case where the failure in the voltage sensor is detected, the method comprises detecting an output current accumulated value which is the accumulated value of the output current from the secondary battery from a time point at which the failure in the voltage sensor is detected and an input current accumulated value which is the accumulated value of the input current to the secondary battery from the time point at which the failure in the voltage sensor is detected and, in a case where the output current accumulated value is equal to or larger than the input current accumulated value by a predetermined value or more, limiting the input power of the secondary battery to a value equal to or smaller than an input power limitation value which is the power equal to or smaller than the allowable input power and limiting the output power of the secondary battery to an output power limitation value which is smaller than the allowable output power and is smaller than the input limitation value and, in a case where the input current accumulated value is larger than the output current accumulated value by another predetermined value or more, limiting the output power of the secondary battery to be equal to or smaller than the input power limitation value which is equal to or smaller than the allowable output power and limiting the input power of the secondary battery to a value equal to or smaller than the input power limitation value which is smaller than the allowable input power and is smaller than the output power limitation value.

23. An input/output power control apparatus for a secondary battery, comprising:
   current sensing means for detecting an input and/or output current of the secondary battery;
   voltage sensing means for detecting a terminal voltage of the secondary battery;
   sensing means failure detecting means for detecting a failures in at least one of the current sensing means and the voltage sensing means;
   allowable input/output power calculating means for calculating an allowable input power by which the secondary battery allowably inputs and an allowable output power by which the secondary battery allowably outputs in a form of allowable input/output powers on the basis of the terminal voltage of the secondary battery detected by the voltage sensing means and the input and/or output current detected by the current sensing means, in a case where the sensing means failure detecting means detects the failures in neither the voltage sensing means nor the current sensing means, and for calculating the allowable input and output powers on the basis of a detected value of one of the current sensing means and the voltage sensing means in which no failure is detected, in a case where the sensing means failure detecting means detects the failure in either one of the current sensing means and the voltage sensing means; and
   input/output power control means for limiting each of input and output powers of the secondary battery to a value equal to or smaller than the corresponding one of the allowable input/output powers calculated by the allowable input/output power calculating means.

24. The input/output power control apparatus for the secondary battery as claimed in claim 23, wherein the sensing means failure detecting means comprises current sensing means failure detecting means for detecting the failure in the current sensing means and the allowable input/output power calculating means calculates the allowable input/output powers of the secondary battery from the terminal voltage detected by the voltage sensing means, in a case where the current sensing means failure detecting means detects the failure in the current sensing means.

25. The input/output power control apparatus for a secondary battery as claimed in claim 23, wherein the sensing means failure detecting means comprises voltage sensing means failure detecting means for detecting the failure in the voltage sensing means and the allowable input/output power calculating means detects a residual capacity of the secondary battery on the basis of the residual capacity of the secondary battery before the failure in the voltage sensing means and an accumulated value of the input/output current of the secondary battery detected by the current sensing means from a time point at which the failure in the voltage sensing means is detected, in a case where the failure in the voltage sensing means is detected, and calculates the input/output power of the secondary battery on the basis of the detected residual capacity.

26. The input/output power control apparatus as claimed in claim 23, wherein the sensing means failure detecting means detects failures in both of the voltage sensing means and the current sensing means and the allowable input/output power calculating means calculates the allowable input/output powers of the secondary battery from the terminal voltage detected by the voltage sensing means, in a case where the sensing means failure detecting means detects the failure in the current sensing means, detects a residual capacity of the secondary battery on the basis of the residual capacity before the failure in the voltage sensing means and an accumulated value of the input and/or output current of the secondary battery detected by the current sensing means from a time point at which the sensing means failure detecting means detects the failure in the voltage sensing means and calculates the allowable input/output powers of the secondary battery on the basis of the detected residual capacity, in a case where the failure in the voltage sensing means is detected.

* * * * *